(12) United States Patent
Watts

(10) Patent No.: US 6,202,273 B1
(45) Date of Patent: Mar. 20, 2001

(54) SHIM REMOVING TOOL

(75) Inventor: Eddie E. Watts, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/364,604

(22) Filed: Jul. 30, 1999

(51) Int. Cl.$^7$ .................................................. B23P 11/00
(52) U.S. Cl. ........................................................ 29/243.56
(58) Field of Search ........................... 29/243.5, 267, 29/270, 278, 268, 239, 225, 229, 426.6, 426.5, 243.56

(56) References Cited

U.S. PATENT DOCUMENTS

| | | | |
|---|---|---|---|
| 1,664,529 | * | 4/1928 | Schroeder ............................ 29/243.56 |
| 2,126,225 | * | 8/1938 | Simons ............................... 29/243.56 |
| 5,225,246 | * | 7/1993 | Beers et al. ......................... 29/243.56 |
| 5,392,504 | * | 2/1995 | Calusinski .......................... 29/243.56 |
| 6,023,833 | * | 2/2000 | Jacobsmeier ....................... 29/243.56 |

OTHER PUBLICATIONS

Photocopy of package for Binder Clips Pince–Notes, BC–100, Stock No. 99100, 2" wide, 1" capacity.

* cited by examiner

*Primary Examiner*—Robert C. Watson
(74) *Attorney, Agent, or Firm*—Andrew C. Hess; Rodney M. Young

(57) ABSTRACT

A tool for removing a shim from a dovetail of a fan blade for a turbine engine rotor includes a clip and a handle. The clip includes a release edge configured to engage a flared lip of a dovetail shim. The handle extends from the clip and contacts the exterior surface of the shim. When the handle and the clip are rotated about a longitudinal axis of the handle, the release edge separates the flared lip of the shim from the dovetail and the handle applies a downward force to easily remove the shim from the dovetail.

16 Claims, 6 Drawing Sheets

SHIM REMOVING TOOL

GOVERNMENT RIGHTS STATEMENT

The United States Government has rights in this invention pursuant to Contract No. F33657-95-C-0055 awarded by the Department of the Air Force.

BACKGROUND OF THE INVENTION

This invention relates generally to tools and, more particularly, to a tool for removing a shim from a stage 2 fan blade for an aircraft engine rotor.

Gas turbine engines typically include a multistage axial flow high pressure compressor which supplies high pressure air to a combustor, and a high pressure turbine downstream from the combustor. The compressor and turbine include multiple stages, and each stage includes a stationary member referred to as a stator and a rotational member referred to as a rotor.

A "stage 2" turbine stage includes a plurality of fan blades attached to, and extending radially from, a fan disk. Each blade includes an airfoil and a dovetail that fits into a dovetail slot on a circumference of the fan disk. Dovetail shims are used to provide a proper fit between each dovetail and dovetail slot. The airfoils extend from the dovetail slots in a radial direction with respect to a center axis of the turbine engine, and define a flowpath for combustion gases.

During maintenance and repair, removing a dovetail shim from a stage 2 fan blade is difficult. Because of the shape of the dovetail, conventional tools are ill-equipped for the removal of dovetail shims. Thus, removing a shim from a dovetail is often difficult and time consuming.

Accordingly, it would be desirable to provide an inexpensive tool that facilitates the quick and easy removal of dovetail shims from stage 2 fan blades without damaging the dovetails.

BRIEF SUMMARY OF THE INVENTION

In an exemplary embodiment of the invention, a tool for removing a dovetail shim from a rotor fan disk blade includes a clip and a handle. The clip includes a base and opposing sides extending from the base. A release edge is located at an end of one side and is configured to be located between the dovetail and the shim. The handle is configured to be located between the opposing sides of the clip and cooperates with the release edge to remove a dovetail shim from a dovetail when the handle and the clip are rotated together about an axis of the handle.

More specifically, the wood handle has a longitudinal axis and a substantially square cross sectional shape. The handle is inserted between the opposing sides of the clip and extends from the clip so that the longitudinal axis of the handle is substantially parallel to the longitudinal axes of the clip sides. The tool is located so that the release edge is engaged with a lip of a dovetail shim, and the handle contacts the exterior surface of the shim. When the handle and clip are rotated about the axis of the handle. The release edge separates the shim lip from the dovetail, and the handle applies a frictional force to the exterior of the shim that facilitates removal of the shim without damaging the dovetail.

DETAILED DESCRIPTION OF THE INVENTION

Figure 1:
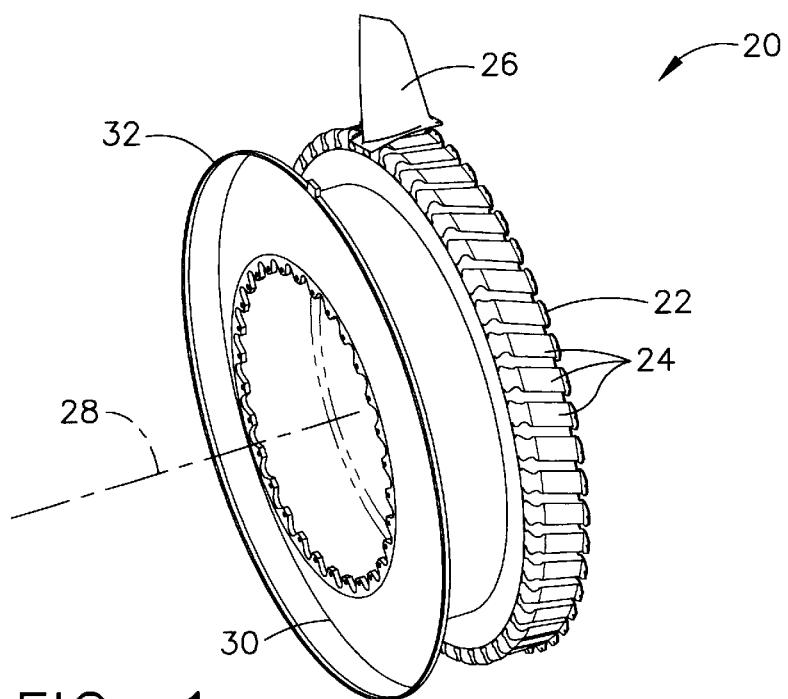
FIG. 1 is a perspective view of a partially assembled aircraft fan rotor.

FIG. 1 is a perspective view of a portion of a stage 2 fan rotor 20 for a turbine engine (not shown). Rotor 20 includes a fan disk 22 including a plurality of dovetail slots 24. A fan blade 26 is inserted into each dovetail slot 24 so that blade 26 extends radially from a center axis 28 of rotor 20. Disk 22 further includes a forward flange 30 and a blade retaining ring 32.

Figure 2:
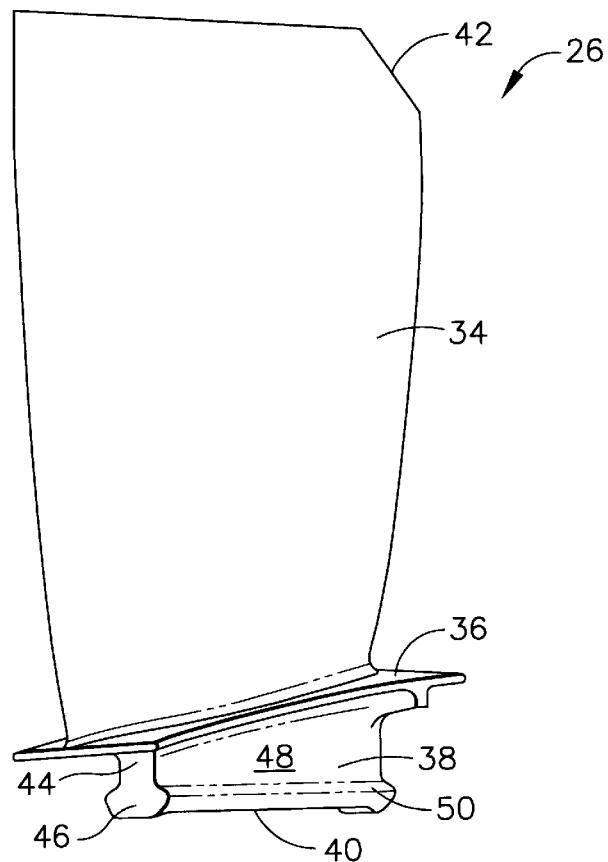
FIG. 2 is a perspective view of a fan blade.

FIG. 2 is a perspective view of fan blade 26 including an airfoil 34, a platform 36, and a dovetail 38. Platform 36 is inclined relative to a bottom 40 of dovetail 38. Airfoil 34 extends above platform 36, includes a tip crop 42 and is aerodynamically shaped to direct combustion gases through rotor 20 (shown in FIG. 1). Dovetail 38 extends below platform 36 and includes an upper portion 44 of substantially constant width and a rounded lower portion 46 including a maximum width near a lower portion midsection and decreasing width above and below its midsection. Dovetail 38 further includes a pair of side surfaces 48 that include a pressure face 50 extending substantially parallel to dovetail bottom 40 and between the dovetail lower portion midsection and dovetail upper portion 44. An aluminum bronze coating is applied to dovetail pressure face 50.

Figure 3:
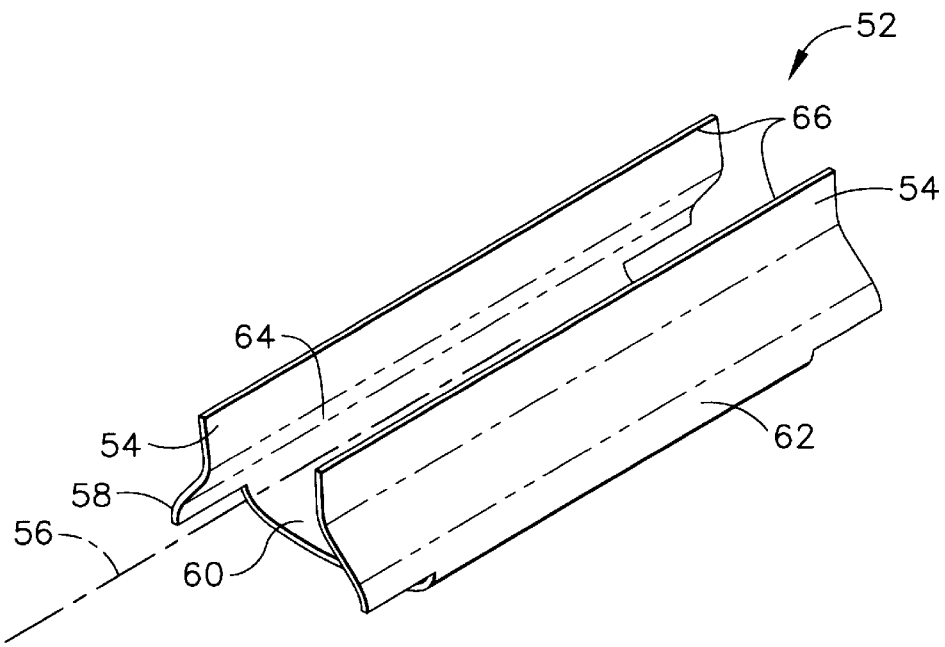
FIG. 3 is a perspective view of a shim used to secure the fan blade shown in FIG. 2 to the rotor shown in FIG. 1.

FIG. 3 illustrates a dovetail shim 52 shaped to be inserted onto dovetail lower portion 46 (shown in FIG. 2). Dovetail shim 52 includes upper flares 54 having outwardly curved sidewalls, i.e., convex to a center axis 56 of shim 52, and a lower portion 58 having inwardly curved sidewalls, i.e., concave with respect to center axis 56. Shim 52 is generally shaped like an hourglass with an open top. Further, shim 52 includes an interior surface 60 and an exterior surface 62. Interior surface 60 includes a pressure face 64 and upper flares 54 include flared lips 66. After shim 52 is installed on dovetail 38, pressure face 64 contacts dovetail pressure face 50 and upper flares 54 are separated by dovetail upper portion 44 (shown in FIG. 2).

Figure 4:
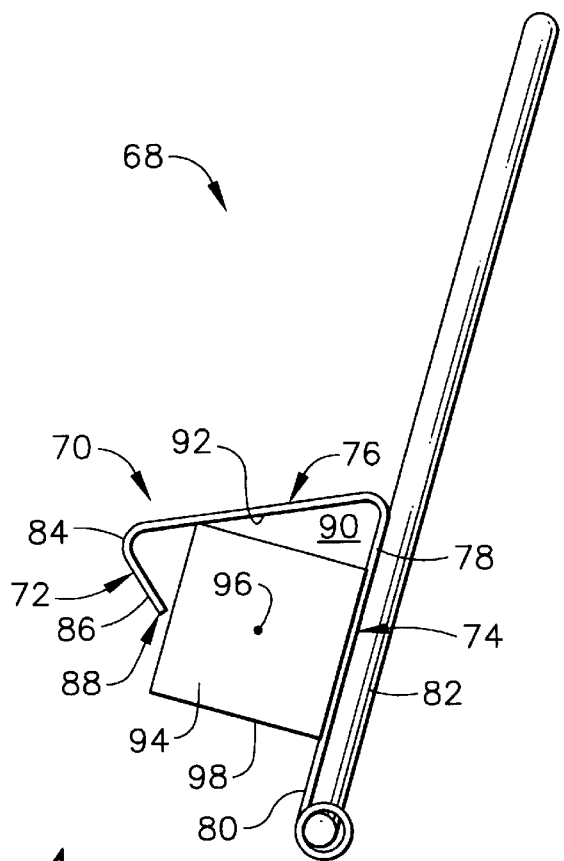
FIG. 4 is a side elevational view of an embodiment of a tool for removing the shim shown in FIG. 3 from the fan blade shown in FIG. 2.
Figure 5:
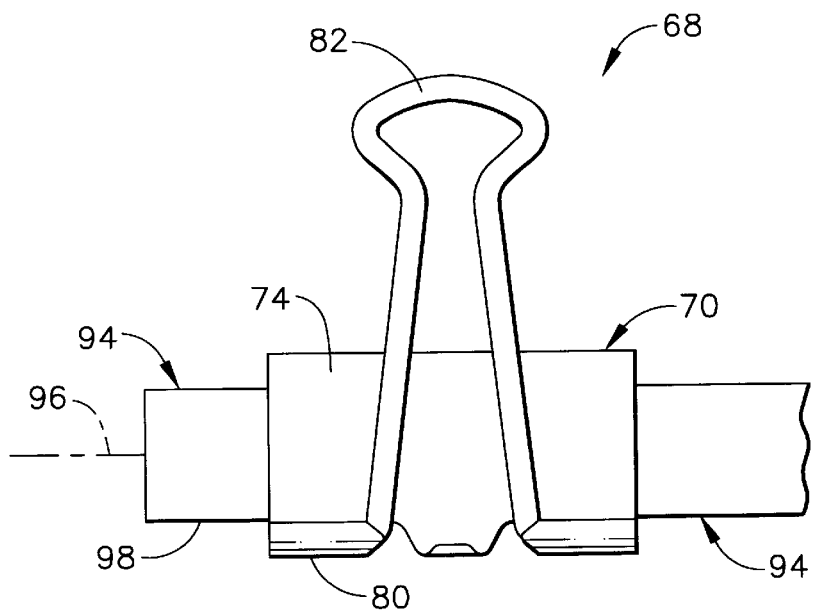
FIG. 5 is a front elevational view of the tool shown in FIG. 4.

FIGS. 4 and 5 are side elevational and front elevational views, respectively, of a tool 68 for removing dovetail shim 52 (shown in FIG. 3) from dovetail 38 (shown in FIG. 2). Tool 68 includes a clip 70 including a first short side 72, a second long side 74, and a base 76. Long side 74 extends a greater distance from base 76 than does short side 72. Long side 74 includes a first end 78 adjacent base 76 and a second end 80. A wire handle 82 extends from, and is connected to, second end 80. Short side 72 includes a first end 84 adjacent base 76 and a second end 86 including a release edge 88. Opposing sides 72 and 74 form a channel 90 therebetween having an interior surface 92. In an alternative embodiment, clip 70 is continuously curved or spiraled. In a further alternative embodiment, clip 70 includes three sides substantially perpendicular to one another and a fourth side having a release edge.

A substantially square handle 94 is configured to be inserted into channel 90 of tool 68. Handle 94 includes a longitudinal axis 96 and is positioned in channel 90 so that longitudinal axis 96 is substantially parallel to long side 74. Further, an exterior surface 98 of square handle 94 is flush with long side 74, contacts base 76, and is separated from second side and release edge 88. A portion of handle 94 protrudes from channel 90 and handle 94 occupies only a portion of channel 90. In an alternative embodiment, handle 94 has a partially curved cross section. In a further alternative embodiment, handle 94 has a cross section with two or more sides of unequal length, such as a generally triangular or rectangular cross sectional shape.

Figure 6:
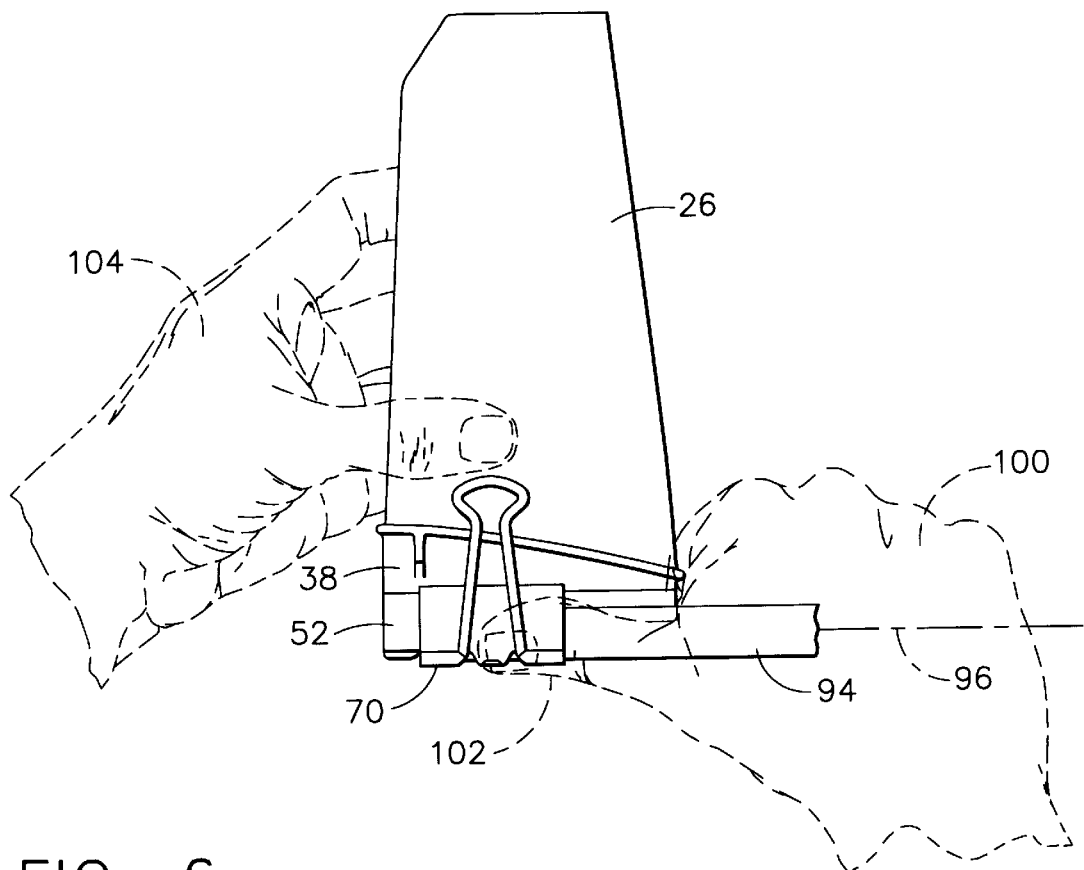
FIG. 6 is an illustration of the tool shown in FIG. 4 in use.

FIG. 6 illustrates removing shim 52 from dovetail 38 using tool 68. Tool 68 is shown in a right hand orientation. Handle 94 extends from clip 70 to the right as clip is viewed from long side 74. Handle 94 is gripped with a right hand 100 and a thumb 102 is placed on clip 70, thereby holding handle 94 properly positioned with respect to clip 70. Fan blade 26 is held in a left hand 104 and clip 70 and handle 94 are rotated together counterclockwise about longitudinal axis 96 of handle 94 to remove shim 52 from dovetail 38.

In an alternative embodiment, tool 68 has a left hand orientation and handle 94 extends to the left as clip 70 is viewed from long side 74. Tool 68 is gripped with left hand 104, and blade 26 is in a right hand 100. In a further alternative embodiment, handle 94 is fixed to clip 70.

Figure 7:
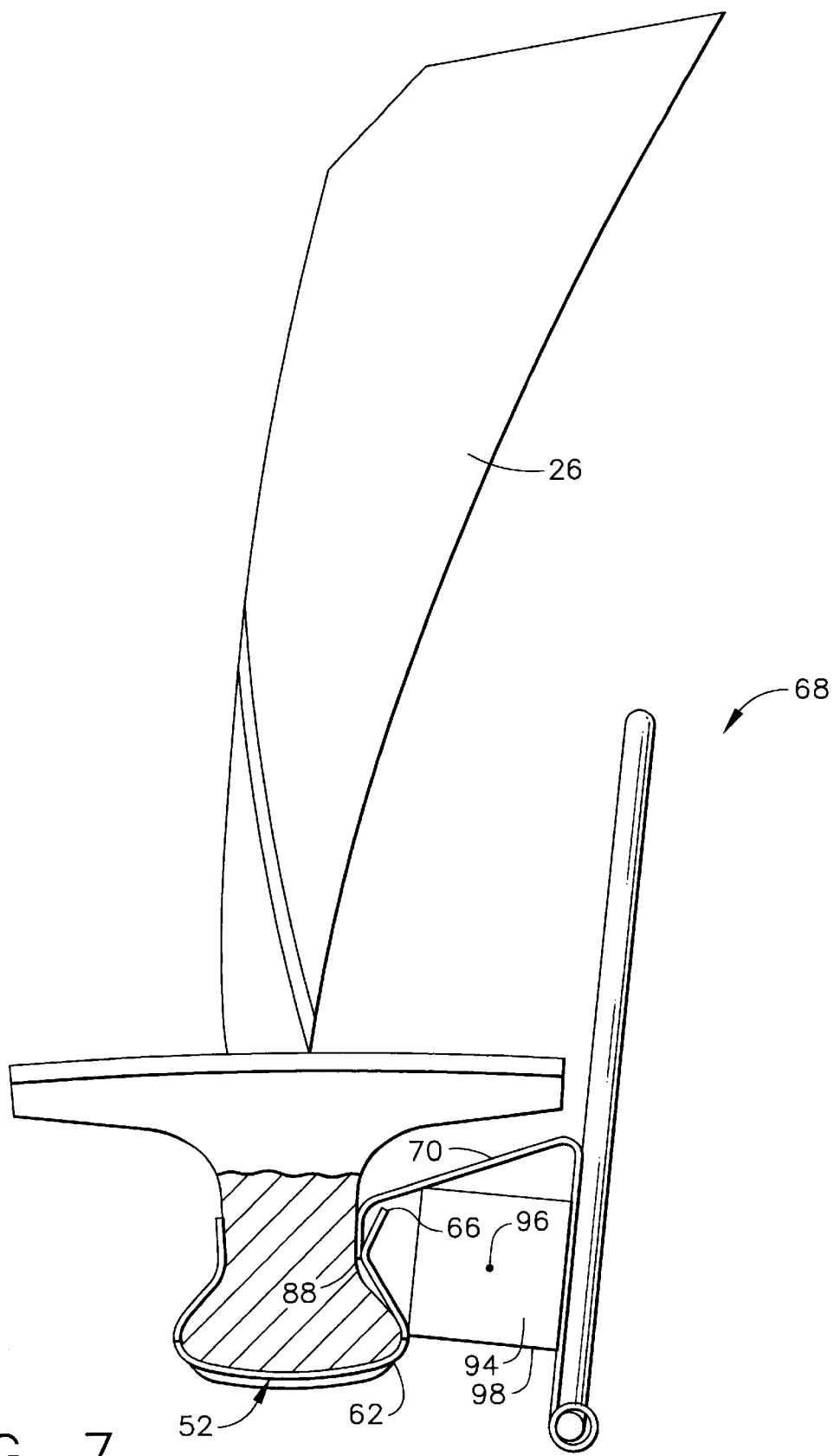
FIG. 7 is a partial side view of the tool shown in FIG. 4 positioned to remove a shim from a blade.
Figure 8:
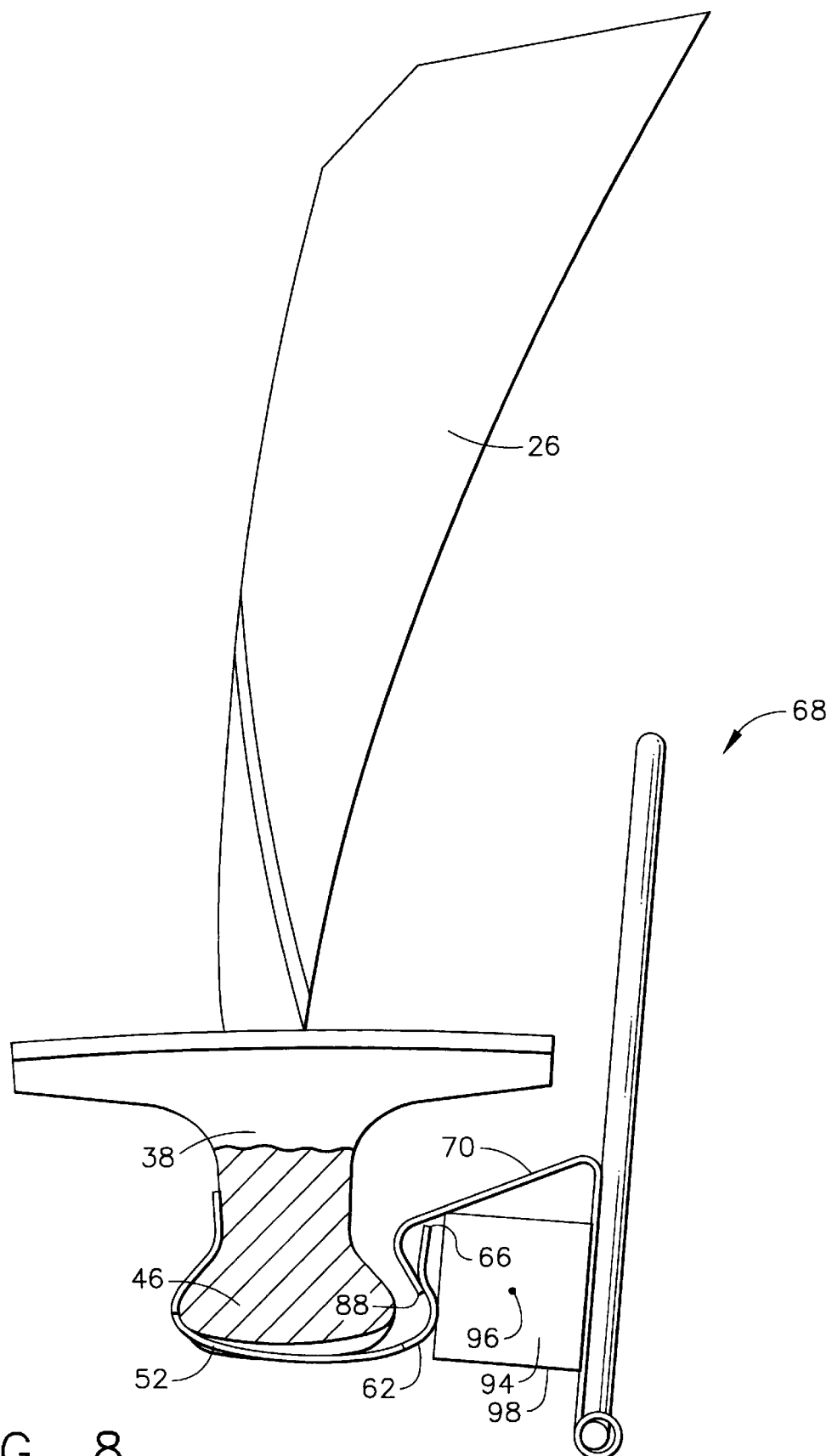
FIG. 8 is a partial side view of the tool and blade shown in FIG. 7 after the tool has been rotated slightly.

FIGS. 7 and 8 illustrate, in more detail, removing shim 52 by rotating tool 68 which has the right hand orientation. Release edge 88 of clip 70 is brought into contact with flared lip 66 of shim 52, and exterior surface 98 of handle 94 is brought into contact with exterior surface 62 of shim 52. Rotating handle 94 and clip 70 about handle longitudinal axis 96 (shown in FIG. 8) separates flared lip 66 from dovetail pressure face 50 and pulls shim 52 from dovetail 38. Meanwhile, exterior surface 98 of handle 94 pushes down on exterior surface 62 of shim 52 and shim 52 slips off of dovetail lower portion 46. Hence, shim 52 is removed quickly and easily, and damage to both dovetail 38 and shim 52 is avoided.

Figure 9:
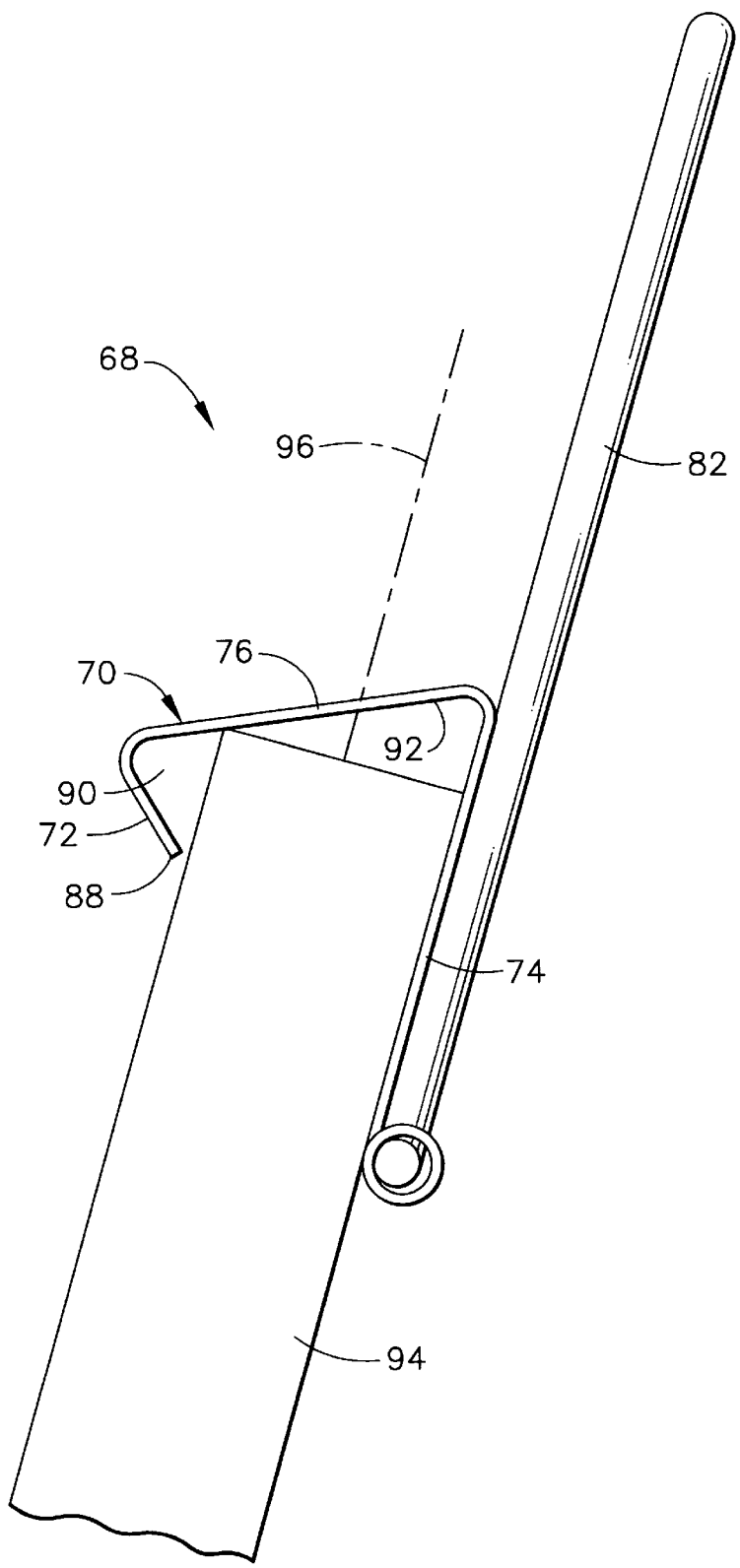
FIG. 9 is a side elevational view of an alternative embodiment of a shim removal tool.

FIG. 9 illustrates an alternative orientation of tool 68. Handle 94 is rotated approximately 90° about clip 70 so that longitudinal axis 96 is parallel to long side 74 of clip 70, but is transverse to base 76 and short side 72 so that longitudinal axis 96 intersects interior surface 92 of clip channel 90. Tool 68 has the right hand orientation. Handle 94 is gripped with a right hand (not shown) with thumb placed over wire handle 82. Release edge 88 is engaged with shim flared lip 66 (shown in FIG. 7) and pressure is applied to handle 94 toward shim 52, i.e., to the left in FIG. 9, causing clip 70 to rotate and separate shim 52 from dovetail 38 (shown in FIG. 8). In an alternative embodiment, tool 68 is used in a left hand orientation by positioning tool 68 and handle 94 as a mirror image of FIG. 9.

Clip 70 is fabricated from a 1 inch capacity spring steel clip binder, such as a clip according to Federal Supply Service Manufacturing No. AC072100 or a Large Binder Clip No. 10220 manufactured for United Stationers Supply Company of Des Plaines, Ill. and sold under the trademark UNIVERSAL. One side of the binder clip is trimmed to form short side 72 that extends for 0.25 inches measured perpendicular from base 76. The rough edges of short side 72 are filed and then stone sharpened to form release edge 88. A 0.75 inch square piece of nonmetallic material, such as wood, is cut to a length of about 7 inches to form handle 94, and handle 94 exterior is beveled and smoothed with an abrasive cloth. Wire handle 82 may be removed from long side 74 of clip 70 or used to facilitate positioning of the handle 94 inside clip 70.

Tool 68 is inexpensive, simple to manufacture, and simple to use. Because clip 70 is made of carbon steel, tool 68 is reliable as clip 70 will not weaken after repeated use. A worker can easily and quickly remove dovetail shims from a full set of forty six fan blades while using tool 68. Damage to both dovetail 38 and shim 52 is avoided. Thus considerable time and expense is saved in aircraft maintenance and repair.

While the invention has been described in terms of various specific embodiments, those skilled in the art will recognize that the invention can be practiced with modification within the spirit and scope of the claims.

What is claimed is:

1. A tool for removing a dovetail shim from a rotor fan disk blade, the blade including a dovetail, the shim including an exterior surface and first and second pressure faces clamped to the dovetail portion, each of the pressure faces having a flared lip extending therefrom, said tool comprising a clip comprising a base and opposing sides extending from said base, an interior surface, a handle, and a release edge at an end of one said side for being located between the dovetail and the shim, said handle configured to be positioned in contact with said clip interior surface.

2. A tool in accordance with claim 1 wherein one of said sides extends a greater distance from said base than the other side.

3. A tool in accordance with claim 1 wherein said release edge is separated from said opposing side.

4. A tool in accordance with claim 1 wherein said handle further configured to be located so as to extend from said clip interior surface.

5. A tool in accordance with claim 4 wherein said handle includes a longitudinal axis, said clip comprises a channel, and said axis of said handle extends through said channel.

6. A tool in accordance with claim 5 wherein said handle partially fills said channel.

7. A tool in accordance with claim 6 wherein said handle has a substantially square cross section.

8. A tool in accordance with claim 7 wherein said handle comprises a nonmetallic material.

9. A tool in accordance with claim 4 wherein said handle is fixed to said channel.

10. A tool for removing a dovetail shim from a rotor fan disk blade, the blade including a dovetail portion, the shim including an exterior surface and first and second pressure faces clamped to the dovetail portion, each of the pressure faces having a flared lip extending therefrom, said tool comprising a wire handle and a clip comprising a side and a release edge configured for contacting the flared lip as said side is rotated about an axis external of the side, said wire handle connected to said clip.

11. A tool in accordance with claim 10 wherein said clip further comprises a second side resiliently separable from said release edge.

12. A tool in accordance with claim 11 wherein said clip comprises metal.

13. A tool in accordance with claim 12 wherein said wire handle connected to said clip side.

14. A tool in accordance with claim 10 further comprising a handle substantially square in cross section.

15. A tool in accordance with claim 14 wherein said handle is fixed to said clip.

16. A tool in accordance with claim 14 wherein said longitudinal axis of said handle is transverse to said side of said clip.

* * * * *